Aug. 18, 1931.　　A. G. RONNING ET AL　　1,819,624
TRACTOR CULTIVATOR
Filed Oct. 29, 1925　　3 Sheets-Sheet 1
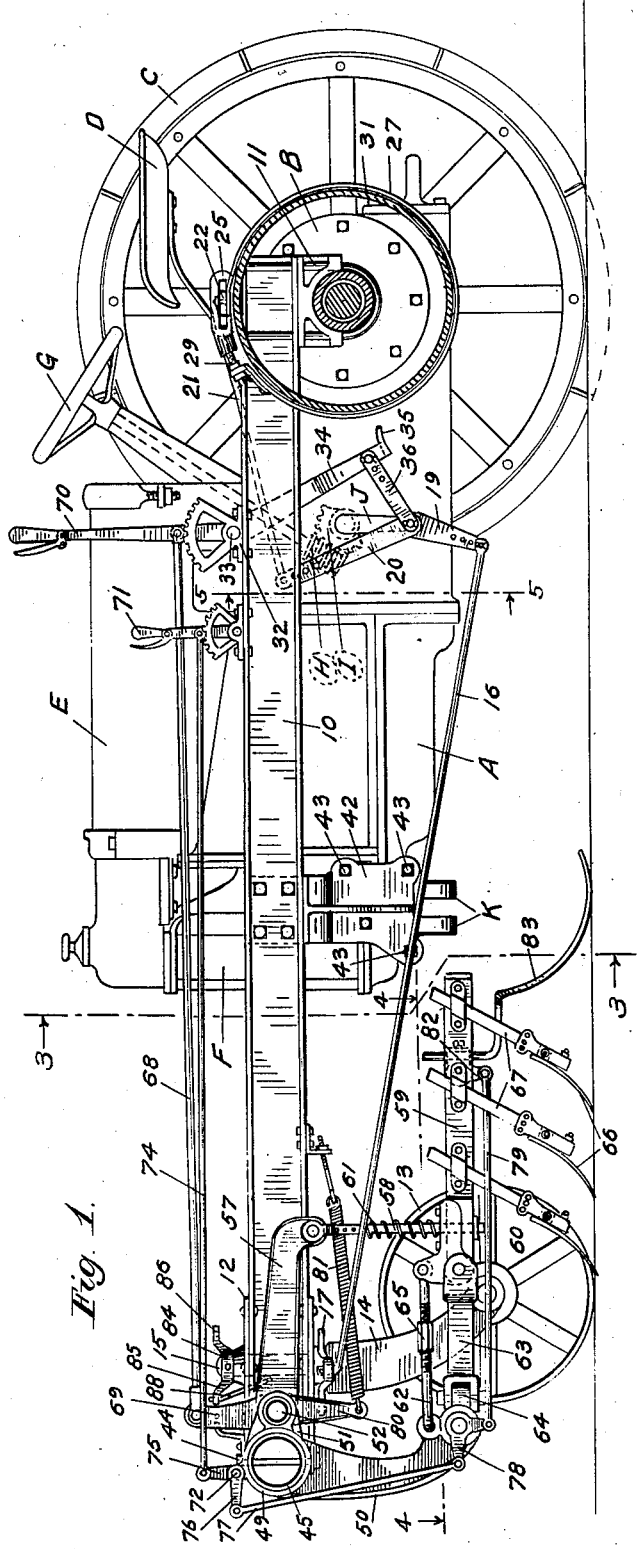
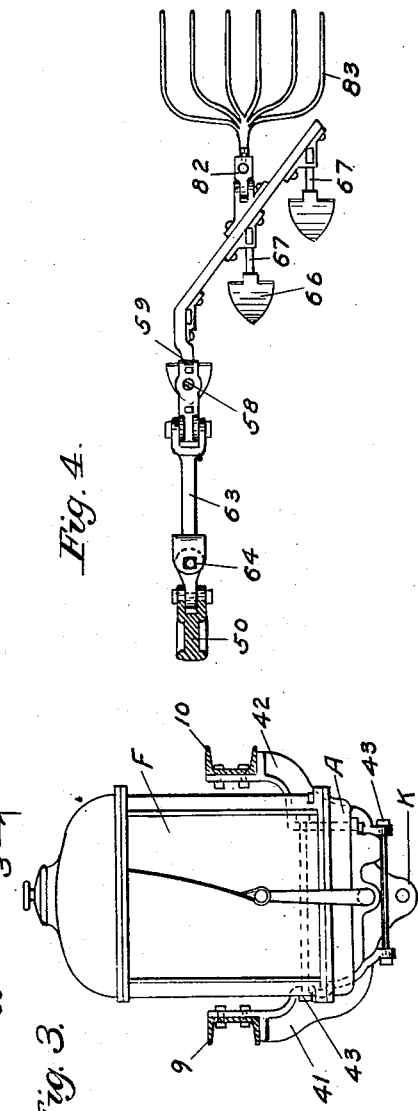
Inventors
ANDREAN G. RONNING
ADOLPH RONNING
By
Attorney Aug. 18, 1931. A. G. RONNING ET AL 1,819,624
TRACTOR CULTIVATOR
Filed Oct. 29, 1925 3 Sheets-Sheet 2

Inventors
ANDREAN G. RONNING
ADOLPH RONNING
By
Attorney

Aug. 18, 1931.  A. G. RONNING ET AL  1,819,624

TRACTOR CULTIVATOR

Filed Oct. 29, 1925   3 Sheets-Sheet 3

Inventors
ANDREAN G. RONNING
ADOLPH RONNING
By
Attorney

Patented Aug. 18, 1931

1,819,624

UNITED STATES PATENT OFFICE

ANDREAN G. RONNING AND ADOLPH RONNING, OF MINNEAPOLIS, MINNESOTA, ASSIGNORS TO INTERNATIONAL HARVESTER COMPANY

TRACTOR CULTIVATOR

Application filed October 29, 1925. Serial No. 65,700.

This invention relates to combination tractor implements and the primary object is to provide a practical, efficient yet comparatively simple and easily controlled and operated apparatus, in which a tractor and an implement are combined in one machine so as to be under the observation and control of a single operator. A further object is to provide means whereby a standard of common type of tractor may be utilized as the power unit forming a part or element of the complete structure. A further and more specific object is to provide a working unit or implement in the form of a cultivator having certain novel features of construction. A still further object is to provide means of a novel and efficient nature for shifting the cultivator tools transversely in the ground, and to simultaneously therewith steer the machine as it travels over the ground. These and further objects will be disclosed and described in the course of the following specification, reference being had to the accompanying drawings, wherein:

Fig. 1 is a left side elevation of the machine, the near rear wheel being removed for purpose of illustration.

Fig. 3 is a sectional elevation as seen about as on the line 3—3 in Fig. 1.

Fig. 4 is a detail plan view of one of the cultivator gang units, as seen on the line 4—4 in Fig. 1.

Figure 2:
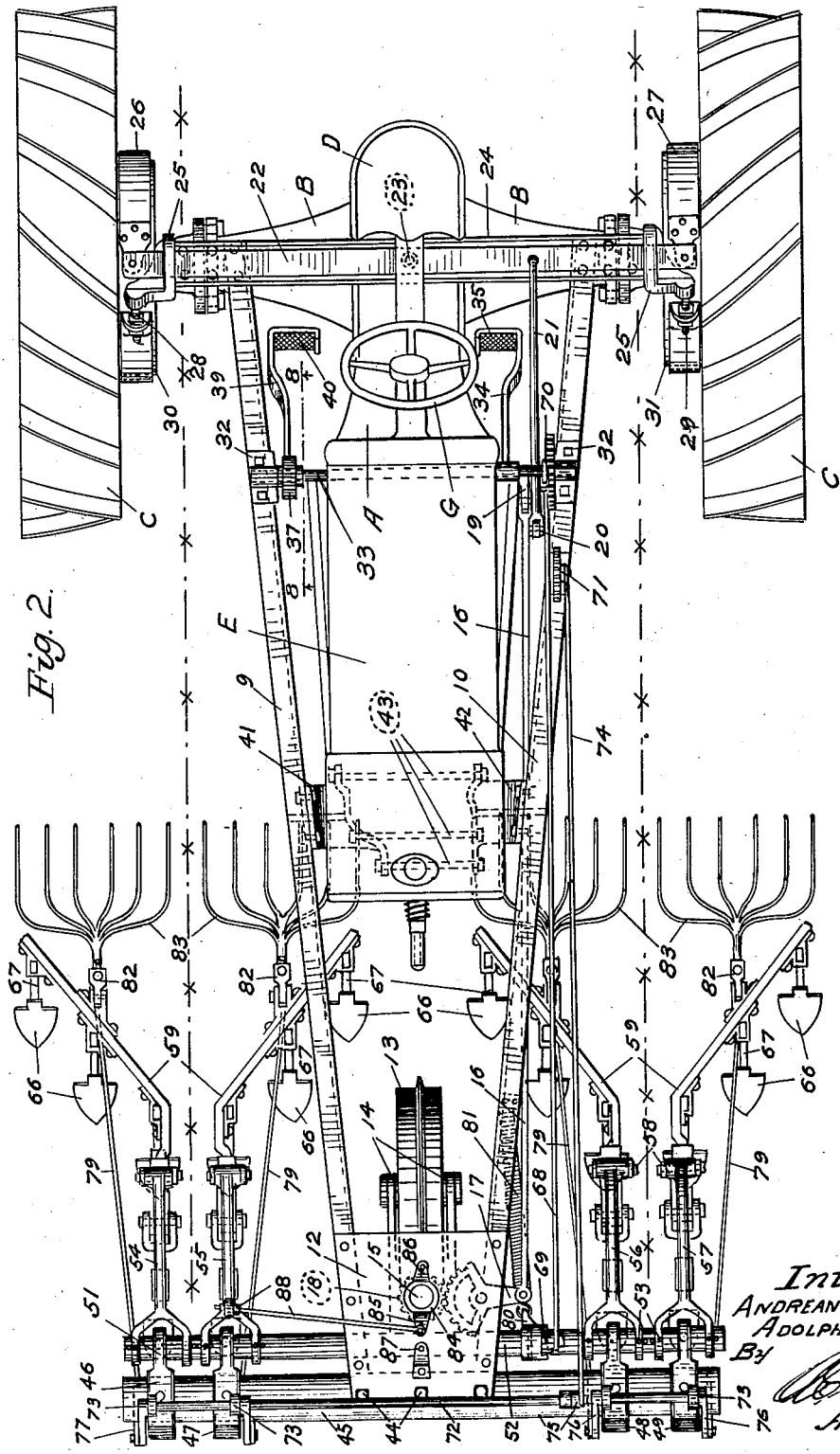
Fig. 2 is a top or plan view of the machine.

Referring to the drawings by reference characters, A designates the body casting or main frame of a common and well known type of tractor having rear axle and differential housings B, rear drive wheels C, a drivers support D, fuel tank E, and radiator F. A hand wheel G operates through a worm H and gear segment I to oscillate a crank J which is normally connected with and arranged to operate the steering carriage which is tiltably connected to a forked coupling bracket K to suppport the front end of the tractor when the same is used as a traction unit only. In converting the tractor into a tractor-implement we dispense with and remove the usual steering carriage and its connections with the crank J. This converting feature is fully disclosed and more broadly covered and described in our co-pending application for patent Ser. No. 451,746, for traction implement, filed March 12, 1921, and in various divisions thereof and patented as 1,658,354 February 7, 1928, and 1,706,256 March 19, 1929.

The front end of the tractor, from which the normal steering carriage has been removed, is now supported, as in the above mentioned patents, by being suspended from and connected to a supplemental frame or substituted fore carriage, which, in the present instance comprises a pair of side bars 9 and 10, the rear ends of which are rigidly secured, as by U-bolt clamps 11, to the rear axle housings B. The bars converge slightly toward their forward ends where they are suitably connected, by a plate member 12. The forward end of the supplemental frame is supported by a castor like wheel 13 having a fork 14 which is pivoted, on a vertical pivot 15, in the frame, and the pivot center is in advance of a vertical plane passing through the axis of the wheel, so that when the fork is turned (on the pivot 15) it will not only angle the wheel to effect steering, but will, previously thereto, first shift or swing the front end of the frame to the side to which the steering is directed, i. e., the frame will swing as far as the center 15 will swing from the spot on which the wheel 13 rests upon the ground. This swinging or shifting of the frame is very important, especially where ground working tools such as cultivators are carried by the frame, as it affords a very convenient and sensitive means for quickly shifting the tools transversely, without waiting for the angled wheel to move the frame sidewise as the machine moves forward through the field.

The wheel 13 is steered from the rear of the machine by means of a rod 16, which is connected at its front end to a rack member 17, which meshes with a pinion 18 on the fork 14. The rear end of the rod 16 is pivotally and adjustably connected to the short or lower arm 19 of a bent lever 19—20, carried on the crank J. The arm 20, in turn, is connected by a link rod 21, to a lever bar 22, which is pivoted, as at 23, to a transverse beam 24 secured upon the rear ends of the side bars 9 and 10. Slotted castings 25, at the ends of the beam 24, permit a restricted oscillating movement of the lever 22 on its pivot 23. The ends of the lever 22 are secured to the free ends of a pair of externally acting brake bands 26 and 27, the other ends of which are adjustably secured to the castings 25, as at 28 and 29. These bands 26 and 27 are arranged to frictionally engage drums 30 and 31, to stop or retard either of the wheels C, but can only act on one drum at a time due to the fact that the lever 22 is pivoted between its ends.

Figure 8:
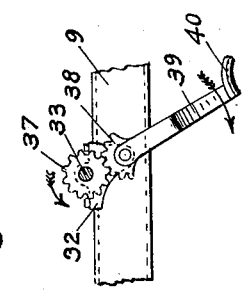
Fig. 8 is a detail view as seen on the line 8—8 in Fig. 2.

Journalled in bearings 32 on the beams 9—10 is a transverse shaft 33, upon the left side of which is non-rotatably secured a lever 34 having a pedal 35, said lever being connected by a link 36 to the crank J. The right end of the shaft 33 is provided with a pinion 37, which meshes with the gear segment 38 of a right foot lever 39 having a pedal 40, the effect of this gearing being to alternate or reverse the movements of the levers 34 and 39, and the object of the pedal arrangement is to enable the operator to use either his hands or his feet (or both if necessary) to steer the machine and guide the cultivator tools. The steering operation may be briefly described as follows:

If the machine is to be angled from its normal forward direction, for instance to the left, the operator may either turn the hand wheel G to the left or may press the pedal 35 with his foot, either action resulting in a forward movement of the crank J. The bent lever 19—20 now acts as an equalizer between the bars 16 and 21, but, with the fulcrum (J) of the lever moving forwardly it will be seen that the bar 16 will move forwardly, and by virtue of the gearing 17—18 will angle the wheel 13 to the left, and at the same time, by pulling on the rod 21, will tighten the brake band 27, thus braking the left wheel C. As the two wheels C are driven through the customary differential mechanism the right wheel will be speeded up, causing the tractor to swing more sharply to the left behind the guiding wheel 13, and permitting the entire machine to pivot, if necessary, on the left wheel C. To return the machine to its forward direction it is only necessary to release the hand wheel G or pedal 35, upon which the wheel 13 will automatically return to its trailing or straight position behind the pivot center 15. To turn the machine to the right the operator either swings the wheel G or depresses the pedal 40. This turns the shaft 33 in an anti-clockwise direction (see Fig. 8) and pulls the crank J rearwardly, thus reversing the above described action on the rods 16 and 21, and angles the wheel 13 to the right while braking the right wheel C.

In our prior Patent 1,706,256, March 19, 1929, we suspended the front end of the tractor from the frame bars by providing an underslung yoke, the ends of which were secured to the bars while the intermediate or lower central portion had a flange which was secured in the coupling bracket (as K) by a pin or bolt. Such a construction, although very simple and practical, necessitated the use of a jack or other means for supporting the front end of the tractor while the front axle was being removed and the yoke applied. In the present instance we provide means whereby the tractor may be secured, with respect to the frame, while still supported on the usual fore carriage, and such means may be briefly described as follows:

A pair of brackets or castings 41 and 42 are secured, respectively, to the frame beams 9 and 10. These castings are preferably shaped so as to conform with the shape of the lower side portions of the front end of the tractor, so as to snugly receive the same, and are connected by bolts 43, which pass under or through the tractor, so as to tie the brackets rigidly together. It may be noted that the two lower bolts 43 pass in front and behind of the coupling members K, and by so doing may be secured in place while the front axle (not shown) is still in place, and, conversely, when the frame is to be removed the normal steering carriage or front axle may be first applied, after which the bolts 43 and the entire frame work may be readily removed. The structure just described forms the subject-matter of our application Serial No. 327,139 filed December 19, 1928.

Suitably secured, as by bolts 44, and carried by the front end of the supplemental frame 9—10—12, is a transversely extending tubular member or cross beam 45, having collars or bracket members 46, 47, 48 and 49, two of which are non-rotatably secured at each end. Each of these bracket members has a long depending arm or drag bar support 50, and a short rearwardly extending bearing portion 51 in which is journaled and slidably arranged a transverse shaft or bar 52. Adjustably but non-rotatably secured to the shaft 52 is a series of four rearwardly extending arms 54, 55, 56 and 57, to the rear ends of which are pivotally secured a series of depending lifting bars 58. These bars are slidable in a series of cultivator beams 59, the movement being positively limited in one direction by collars 60 and yieldingly limited in the other or downward direction by springs 61. Each of the beams 59 is connected to its drag bar support 50 by a pair of parallel acting draw bar links 62 and 63, the latter of which has a vertical pivot 64 to permit lateral adjustment, while the former is provided with a turnbuckle 65 for length adjusting purposes. The ground engaging or cultivator tools 66 have shanks 67 which are adjustably secured to the beams 59, but the tools customarily operate at a uniform depth in the soil. This uniformity of depth is retained when the plow beam is raised and lowered, due to the parallel action of the members 62 and 63, and thus the beams 59 are always horizontal and cause all the tools to engage the ground at the same time and at the same depth, which they would not do if the beams were each raised and lowered from a stationary pivot. The implement beams 59 are all raised and lowered simultaneously by rotating the shaft 52, which controls the vertical position of the members 57 and 58, and this rotation is effected by a rod 68, which connects a crank arm 69, on the shaft 52, with an adjustable hand lever 70, which pivots on the shaft 33 within reach of the operator on the operator's seat or station D.

A downwardly depending arm 80 of the shaft 52, is connected by a spring 81, to the frame bar 10, which spring is employed to partly counterbalance the weight of the tool gangs so that they may be raised and lowered more easily.

A second hand lever 71, also within reach of the operator, is used to oscillate a shaft 72, mounted in bearings 73, through a rod 74 and a crank 75 fixed to the shaft. This shaft is provided with four arms 76, connected by links 77 to bell crank levers 78 at the lower ends of the casting supports 50. From the other arm of each of these bell cranks levers extends a link bar 79, arranged to oscillate a small casting member 82, which is pivoted to the beam 59, and carries a rearwardly directed fork or series of tines 83. These forks are drawn over or immediately under the surface of the soil and serve as gauges to limit the operating depth of the tools 66 and, in conjunction with lifting bars 58, to control the desired elevation of beams 59. They are particularly useful in determining proper cultivating depth, as they will ride over the tops of the roots of the corn (or similar crop) and thus prevent injury to such roots by the tillage tools 66 going too deep. The rear ends of these forks are slightly curved upwardly, as shown in Fig. 1, and by being so formed will tend to uproot and lift up weeds which will have a tendency to cling to them. Incidentally these forks form a further useful purpose in breaking up and effectively pulverizing the ground rearwardly of the cultivator tools.

The shank 15 of the fork 14 is provided at its upper end with a collar 84, having a forwardly projecting ear 85 and a rearwardly projecting ear 86, while a similar but stationary ear 87 is rigidly secured upon the upper frame plate 12. A link bar 88 is adapted to be selectively secured at one end to either of these ears, while its other end is permanently secured to the member 55 on the shaft 52. The object of this mechanism is to determine and effect the transverse shifting of the cultivators through swiveling movements of the caster when in operation and may be described as follows:

When the rod 88 is secured to the ear 87, the shaft 52 will be locked against longitudinal movement in the members 46—49 and the tools 66 will only move transversely in the soil when and as the front end of the machine is steered to either side. If the rod 88 is connected with the ear 86, then when the machine is turned, for instance to the left, the rod 88 will slide the shaft 52 to the right, and when this is done the cultivator beams will also shift to the right, from the centers 64, so that the cultivators will travel in paths which are substantially parallel to the path of the wheel 13. For a quicker and more sensitive adjustment than either of those above indicated we connect the rod 88 to the ear 85, as shown in Fig. 1. When the machine is now steered to the left movement of the caster not only shifts the entire frame to the left but also slides the shaft 52 to the left, and this in turn also moves the cultivator gangs, to the left, which swing from the centers 64. We are aware of the fact that cultivators have been made and used which shift the gangs in synchronism with steering devices, but believe it to be new to provide the several shifting arrangements in one machine, whereby the desires of the operator and the operating conditions may be so readily met.

Attention is now directed to the rear end construction of the tractor which has been modified to adapt the tractor more efficiently to the purpose of cultivating corn, cane, etc. It might first be explained that crops such as corn are usually planted in rows about forty-two inches apart, and that the distance between the centers of the traction wheels on most of the well known and widely used types of tractors is about fifty or fifty-two inches. This traction wheel span is a very convenient one when the tractor is employed for ordinary traction purposes, and, when used in combination with a cultivator this span is sufficient to straddle one row of corn. In such a case, however, if a two row cultivator is employed, one set will necessarily have to be offset considerably to one side, which is objectionable for many reasons. Furthermore if a castor wheel such as 13 were employed, it would also have to be offset or else it would travel over or very close to the center corn row, which would also be objectionable if not impractical. It may also be noted that when the tractor straddles only one row of corn said corn would pass directly under the center of the engine and differential housing which are the lowest parts of the tractor body, and are in fact so low as to practically prevent the efficient cultivation of corn, which has reached a substantial height.

To overcome these difficulties and give greater stability and rigidity to the machine, which is preferably provided with only one front or steering wheel, and also to render the steering by braking more effective, we provide the tractor either with substituted or extended wheels, or with reversible wheels which will serve the double purpose. In either event the span of the wheels is increased to the extent that they will span or straddle two rows of corn, and permit the front wheel 13 to travel centrally between the two rows. It will now be seen that the cultivators can be equally distributed to both sides of the machine and that the corn rows will pass under the highest points of the rear axle housing and entirely escape contact with the rest of the tractor.

Figure 5:
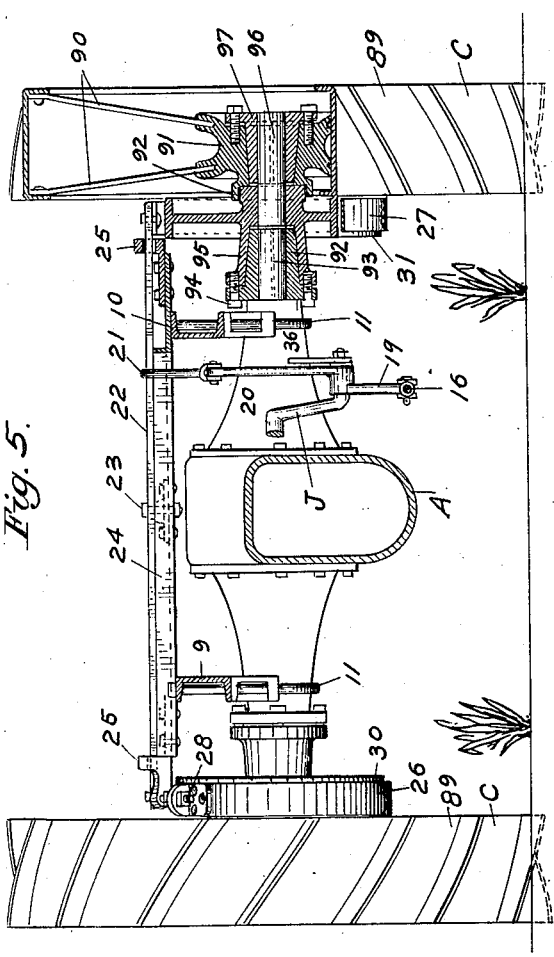
Fig. 5 is a cross sectional elevation about as on the line 5—5 in Fig. 1, and also shows the left drive wheel and hub construction partly in section.

Fig. 5 shows a common type of tractor construction which has been converted in accordance with our invention. In this case, the wheels C are the usual tractor wheels, and consist of rims 89, spokes 90, and a hub 91 having a tapered central hole and a flange 92. With each wheel reversed, i. e., turned about, the hub 91 will fit upon the tapered collar 92, secured on the axle 93, where it may be drawn up and secured with bolts such as 94. Such is the usual construction. In our converting process, we first remove the wheel, and then substitute for it the hub of the brake 30 (or 31), said hub having a tapered sleeve portion 95, which is now drawn up and secured by the bolts 94. The brake hub is also provided with a rigid stub shaft 96 on which is splined or keyed a tapered collar 97 which is preferably identical in construction with the member 92 so as to minimize manufacturing costs. The members 97 is of course secured to and supports the wheel C in the same manner as described in connection with the collar 92, except that the traction wheel is reversed.

Figure 6:
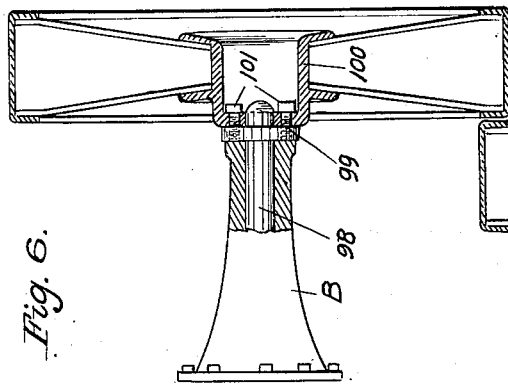
Fig. 6 and Fig. 7 are sectional elevations showing modifications in the drive wheel constructions.
Figure 7:
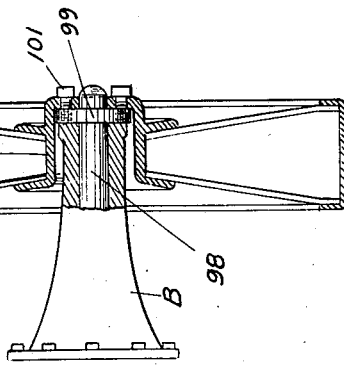

In the wheel construction shown in Figs. 6 and 7 the usual rear axle is substituted by an axle 98 having an integrally formed or rigidly secured collar 99. The traction wheel hub 100 in this instance, is of a sleeve like nature adapted to pass over the collar 99 and the outer end of the housing B (as in Fig. 7) and is secured by an annular series of bolts 101 to the collar 99. To increase the span of the traction wheels it is now only necessary to remove and reverse them, after which they are again secured by the bolts 101, as in Fig. 6.

Having now fully shown and described one embodiment of our invention, what we claim to be new and desire to protect by Letters Patent is:

1. The combination with a tractor, of tillage means comprising a cross member, vertically spaced parallel members trailing from the cross member and having forward ends connected thereto for vertical movement, an implement beam horizontally pivoted at its forward end to the rear ends of said parallel members and trailing therefrom, and adjustable means for controlling the elevation of the implement beam while maintaining it in horizontal position including separate supporting elements connected to the respective ends of the beam.

2. The combination with a tractor, of tillage means comprising a cross member, vertically spaced parallel links having forward ends connected to the cross member for vertical movement, means for adjusting the length of one of said links, an implement beam horizontally pivoted to the rear ends of both of said links, and means for controlling the elevation of the beam comprising a ground engaging gauge member connected to the beam.

3. The combination with a self-propelled vehicle comprising a frame, dirigible supporting means at one end thereof and means for turning said dirigible supporting means to steer the vehicle, of a transverse bar mounted on the frame by means permitting both rotary and axial movements of the bar, tillage implements connected to the bar by means which impart movements of the bar thereto, means operable by turning the dirigible supporting means for shifting the bar axially, and means on the tractor for turning the bar on its axis to raise and lower the implements.

4. The combination with a self-propelled vehicle comprising a frame, dirigible supporting means at one end thereof and means for turning the dirigible supporting means to steer the vehicle, of a cross member carried by the frame and projecting laterally beyond each side of the vehicle, tillage implements including beams having forward ends supported on the respective ends of said cross member by lifting means which are slidable longitudinally of said member, and means actuated by steering movements of the dirigible supporting means for shifting said lifting means and implement beams on the cross member.

5. An implement carrying attachment for tractors, comprising supporting means adapted to be secured to the body of a tractor, an elongated bar connected to the supporting means by bearings which permit free rotary and axial movement of the bar with respect to the supporting means, means for controlling said movements, and tillage implements connected to the bar by lifting and lowering connections actuated by rotary movement of said bar.

6. An implement carrying attachment for tractors, comprising supporting means adapted to be secured to the body of a tractor to extend forwardly thereof, a cross member carried by said support to project laterally beyond each side of the tractor body, tillage tools including beams having forward ends supported on the respective ends of said cross member by lifting means which are slidable longitudinally of said member, and means adapted to be controlled from a location on the tractor for shifting said lifting means and tool beams on the cross member during travel of the tractor.

7. An implement carrying attachment for tractors, comprising supporting means adapted to be secured to the body of a tractor to extend forwardly thereof, a cross member secured at its middle on said supporting means and projecting laterally beyond each side thereof, a bar arranged in parallel relation to said member and connected thereto by bearings which permit both rotary and axial movement of the bar, tillage tools having beams connected to the bar by means which impart movements of the bar thereto, and individual means adapted to be controlled from a location on the tractor for shifting the bar axially to shift the tools and for turning it on its axis to lift and lower them.

8. A traction implement comprising a frame and traction members for propelling the same, supporting means for the forward portion of the frame including an upright member swiveled on the frame and having opposite radial projections, tillage implements mounted on the frame for lateral shifting movement, and means for shifting said implements by swiveling movement of said member including a link connected to said implements and interchangeably connectible to any of the projections on said member for effecting changes in the shifting movement imparted to the implements.

9. A traction implement comprising a frame and traction members for propelling the same, dirigible supporting means supporting the forward portion of the frame including a vertical shaft swiveled on the frame, means on the implement for oscillating said shaft, fixed arms projecting horizontally from the front and rear of said shaft, a transverse bar carried in bearings on the frame for movement in the direction of its axis, tillage implements connected to the bar, and a link connected to the bar and interchangeably connectible to either of the ears on the vertical shaft whereby the reversal of the initial movement imparted to the bar may be effected.

10. The combination with a tractor having a dirigible front guide wheel, of a laterally swingable beam pivotally supported on the forward end of the tractor and trailing at one side of said wheel, a lifting rockshaft for the rear end of said beam, and means operated by steering of the guide wheel for moving the rockshaft laterally to swing and maintain the beam in substantially parallel relation to the path of the guide wheel.

11. The combination with a tractor having a dirigible caster-like front guide wheel, of a plurality of laterally swingable cultivator beams pivoted at their forward ends to the front portion of the tractor and trailing at opposite sides of said wheel, a transversely extending rockshaft mounted on the tractor for sliding movement axially and having lifting links connected to the rear portions of the beams, and means operated by steering of the guide wheel for shifting the rockshaft axially away from the direction of steering movement to thereby swing and maintain the beams in substantially parallel relation to the path of the guide wheel.

12. In a tractor cultivator comprising a tractor, an implement frame mounted thereon, and a trailing implement beam pivoted on the frame, the combination therewith of a ground engaging gage member connected to the beam for adjustment vertically and means for adjusting the gage member from a location on the tractor remote from said gage member, comprising a control element movably mounted on the tractor and pivoted linkage connecting the control element with the gage member and intermediately supported on the frame.

In testimony whereof we affix our signatures.

ANDREAN G. RONNING.
ADOLPH RONNING.